(12) United States Patent
Li et al.

(10) Patent No.: US 11,602,704 B2
(45) Date of Patent: Mar. 14, 2023

(54) RAKE-FREE THICKENING DEVICE INCLUDING DRIVING AREA

(71) Applicant: ANHUI UNIVERSITY OF SCIENCE & TECHNOLOGY, Huainan (CN)

(72) Inventors: Hui Li, Huainan (CN); Chao Wang, Huainan (CN); Erning Zhao, Huainan (CN); Junlong Yang, Huainan (CN); Hui Shen, Huainan (CN); Biao Hu, Huainan (CN); Yu Zhang, Huainan (CN); Chengliang Qiu, Huainan (CN); Jiaqiang Zhou, Huainan (CN); Jin Zhang, Huainan (CN)

(73) Assignee: ANHUI UNIVERSITY OF SCIENCE & TECHNOLOGY, Huainan (CN)

( * ) Notice: Subject to any disclaimer, the term of this patent is extended or adjusted under 35 U.S.C. 154(b) by 84 days.

(21) Appl. No.: 17/035,691

(22) Filed: Sep. 29, 2020

(65) Prior Publication Data
US 2021/0178293 A1 Jun. 17, 2021

(30) Foreign Application Priority Data
Dec. 13, 2019 (CN) .......................... 201911283916.1

(51) Int. Cl.
*B01D 21/24* (2006.01)
*C02F 11/15* (2019.01)
(Continued)

(52) U.S. Cl.
CPC ......... *B01D 21/2405* (2013.01); *B01D 19/02* (2013.01); *B01D 21/0009* (2013.01);
(Continued)

(58) Field of Classification Search
CPC ...... C02F 1/488; C02F 1/5272; C02F 11/121; C02F 11/14; C02F 11/15; C02F 2103/10; C02F 1/52; C02F 2001/007; C02F 2305/12; C02F 1/5281; B01D 21/2405; B01D 19/02; B01D 21/0009; B01D 21/0012;
(Continued)

(56) References Cited

FOREIGN PATENT DOCUMENTS

| CN | 102824955 A | * | 12/2012 |
| CN | 203954760 U | * | 11/2014 |

(Continued)

*Primary Examiner* — Bradley R Spies
*Assistant Examiner* — Jeannie McDermott
(74) *Attorney, Agent, or Firm* — Daniel M. Cohn; Howard M. Cohn

(57) ABSTRACT

Disclosed is a rake-free thickening device including driving area. The device includes a feed assembly, a diversion assembly and a clean coal collection assembly. The clean coal collection assembly includes a driving area. The diversion assembly includes a central tank. Slime water passes through the feed assembly and flows with a medicament from an upper part of the central tank to a middle of the central tank, and then diffuses around. Bubbles carry the fine slime up after reacting. The driving zone drives the dispersed bubbles to a defoaming zone located in the middle of the central tank. The slime water in the central tank flows through the central tank after defoaming. With the continuously filling of slime water, the slime water above the central tank overflows the central tank to the clean coal collection assembly within the diversion and settlement area.

7 Claims, 10 Drawing Sheets

(51) Int. Cl.
| | |
|---|---|
| *B01D 19/02* | (2006.01) |
| *B01D 21/00* | (2006.01) |
| *B01D 21/01* | (2006.01) |
| *B01D 21/08* | (2006.01) |
| *B01D 21/28* | (2006.01) |
| *C02F 1/20* | (2006.01) |
| *C02F 1/48* | (2006.01) |
| *C02F 1/52* | (2006.01) |
| *C02F 11/121* | (2019.01) |
| *C02F 11/14* | (2019.01) |
| *C02F 103/10* | (2006.01) |

(52) U.S. Cl.
CPC ..... *B01D 21/0012* (2013.01); *B01D 21/0084* (2013.01); *B01D 21/01* (2013.01); *B01D 21/08* (2013.01); *B01D 21/286* (2013.01); *C02F 1/20* (2013.01); *C02F 1/488* (2013.01); *C02F 1/5272* (2013.01); *C02F 11/121* (2013.01); *C02F 11/14* (2013.01); *C02F 11/15* (2019.01); *C02F 2103/10* (2013.01)

(58) Field of Classification Search
CPC .... B01D 21/0084; B01D 21/01; B01D 21/08; B01D 21/286; B01D 21/10; B01D 21/2444; B01D 21/02
See application file for complete search history.

(56) References Cited

FOREIGN PATENT DOCUMENTS

| | | | | |
|---|---|---|---|---|
| CN | 104307219 A | * | 1/2015 | |
| CN | 105944407 A | * | 9/2016 | ......... B01D 21/0003 |
| CN | 108792036 A | * | 11/2018 | ............ B65B 39/00 |
| CN | 209161545 U | * | 7/2019 | |
| JP | 2007216113 A | * | 8/2007 | |
| JP | 5717391 B2 | * | 5/2015 | |

* cited by examiner

RAKE-FREE THICKENING DEVICE INCLUDING DRIVING AREA

CROSS-REFERENCE TO RELATED APPLICATIONS

The application claims priority to Chinese patent application No. 201911283916.1, filed on Dec. 13, 2019, the entire contents of which are incorporated herein by reference.

TECHNICAL FIELD

The disclosure relates to the field of slime water treatment, and more specifically, to a rake-free thickening device including a driving area.

BACKGROUND

In the coal washing and processing process, the slime water treatment is the final link of the washing process, which is the key to the effective collection and utilization of coal slime and the closed circuit of washing water. The thickening device has been widely used as a carrier and key equipment for the treatment of slime water, which is of great significance to the closed circulation of the washing water, the full utilization of the underflow concentrate and the environmental protection.

With the integration and large-scale coal washing plant, the processing capacity has been greatly increased, and the output of slime water and the content of fine mud in the slime water have also increased significantly. Therefore, the thickening device has to increase in diameter during the application process, and some equipment even have reached the diameter size of 45 m and above, and due to the finer sludge and the increase in the processing volume, the settlement time is short and the settlement effect is poor. The fine sludge in the washing circulating water cannot be effectively removed, which will seriously affect the quality of coal washing. Therefore, many coal preparation plants have added a second stage or even a third stage of concentration to further purify the washing circulating water, which will occupy a large amount of land, and still, there are residual coal foams in the washing stage that has not been fully recovered in the washing stage, resulting in waste of clean coal and great economic losses.

SUMMARY

In order to make full use of the multi-stage sedimentation technology to realize the multi-stage thickening combination in the thickening structure, and at the same time to use the defoaming technology to realize the recovery and utilization of the clean coal on the residual mineralized foam. The floor space will be greatly reduced and the recovery of clean coal will be increased. The multi-stage and diversified utilization of mud is realized by the addition of clean coal collection. The economic income has increased and the waste has been greatly reduced. Thus, the present disclosure provides a rake-free thickening device including a driving area.

In order to achieve the above objectives, the present disclosure adopts the following technical solutions:

The thickening device includes a feed assembly, a diversion assembly, a clean coal collection area. The clean coal collection assembly includes a driving area, and the diversion assembly includes a central tank. The slime water passes through the feed assembly and flows with the agent from the upper part of the central tank to the middle of the central tank, and then diffuses around. The bubbles carry the fine slime up after reacting, the driving zone drives the dispersed bubbles to the defoaming zone located in the middle of the central tank. The slime water in the central tank flows through the central tank after defoaming. With the continuously filling of slime water, the slime water above the central tank overflows the central tank to the clean coal collection assembly of the diversion and settlement area. The diversion and settlement area is set on the outer side wall of the central tank.

The advantages of the present disclosure are described as follows.

The device realizes the structural integration of traditional multi-stage thickening tanks, which greatly reduces the occupied area of traditional multi-stage thickening tanks.

The device gathers the foam toward the center, and after passing through the defoaming zone, the slime water overflows to the fine slime at the settlement of the diversion settlement zone.

The device realizes the separation of coarse slime products and fine slime products. Coarse slime products can be used as coal blending for mid-coal products for it's high coal content, thus increasing economic income, reducing waste, achieving concentrated accumulation and discharge of fine slime products, reducing pollution, and achieving more sufficient separation of fine mud and water and greatly improving the deterioration of the washing process caused by circulating water.

Whether the fine mud can settle in the thickening device mainly depends on the movement distance of the fine particles in the vertical direction. The setting of the high and low baffles in the diversion settling screen can make the slime water obtain sufficient settling time in the limited space and achieve the full sedimentation of the fine mud.

The setting of the defoamer can realize the desorption of the concentrate on the residual mineralized bubbles by means of pulsation hammering, while the jet water can still realize the flushing and collection of the wall concentrate.

The magnetic gathering sprayer is set up to use magnetic particles as the magnetic seed to strengthen the adhesion of the flocculant, thereby accelerating the adhesion of the fine mud and the flocculant, realizing the accelerated sedimentation of the fine mud, and further realizing the full separation of mud and water.

The feeding mouth is a bell shaped feeding mouth and the dispersing guide plate to divide the horn outlet to form a multi-channel outlet cloth, which makes the cloth more uniform and optimizes the settlement environment.

The setting of the feeding component realizes the addition of flocculating agent through the ejection effect, and at the same time, the sudden expansion and contraction of the fluid causes the pressure difference to change, resulting in increased turbulence, so as to achieve the full mixing of the flocculant and the slurry.

DETAILED DESCRIPTION OF THE EMBODIMENTS

A rake-free thickening device including a driving area is provided. The thickening device includes a feed assembly, a horizontal support rod and a clean coal collection area. The clean coal collection assembly includes a driving area, a bubbles deforming area and a diversion and settlement area. The guide assembly 2 includes a central groove body 21 with a cylindrical part at the upper end and a funnel part at the lower end. The central groove body 21 is made of a cavity structure. The feed assembly is arranged above the cavity of the central groove body 21. The lower end of the central groove body 21 is provided with a first discharge port 24. The coarse slime gradually sinks to the top of the first discharge port 24 of the central tank body 21 and deposits to a certain amount, and is discharged through the first discharge port 24. The collected materials discharged from the first discharge port 24 can be used for blending of medium coal or as building materials to increase economic income.

Figure 1:
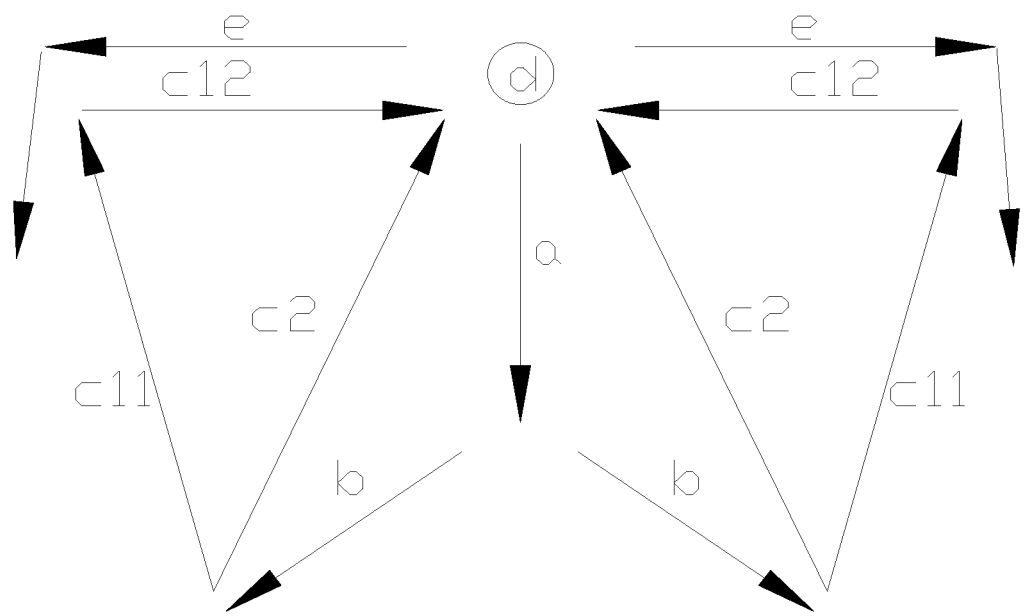
FIG. 1 is a schematic diagram of the flow direction of slime water in the present disclosure.

The materials and medicaments flow from the upper part of the central tank 21 to the middle of the central tank 21, as is shown in FIG. 1, the direction a. The materials and medicaments then diffuse outward from the middle in a direction b, and then enter into the funnel part of the central tank 21. After the reaction, coarse slime flows out from the first discharge port 24, and the diversion component causes the floating foam with fine slime to move upward, and then enters the driving zone to guide the foam to the bubbles deforming zone d. The defoamed slime water overflows the central tank body 21 in the direction of e to the diversion settlement area provided on the outer side wall of the central tank body, thereby separating the water and the settled clean slime. Specifically, the foam with fine coal slime can go up along the inner side wall of the central tank body 21 and then pass through the driving zone to enter the defoaming zone, or directly enter the defoaming zone through the middle of the central tank body 21.

The components are described in detail below.

1. Feed Assembly

Figure 2:
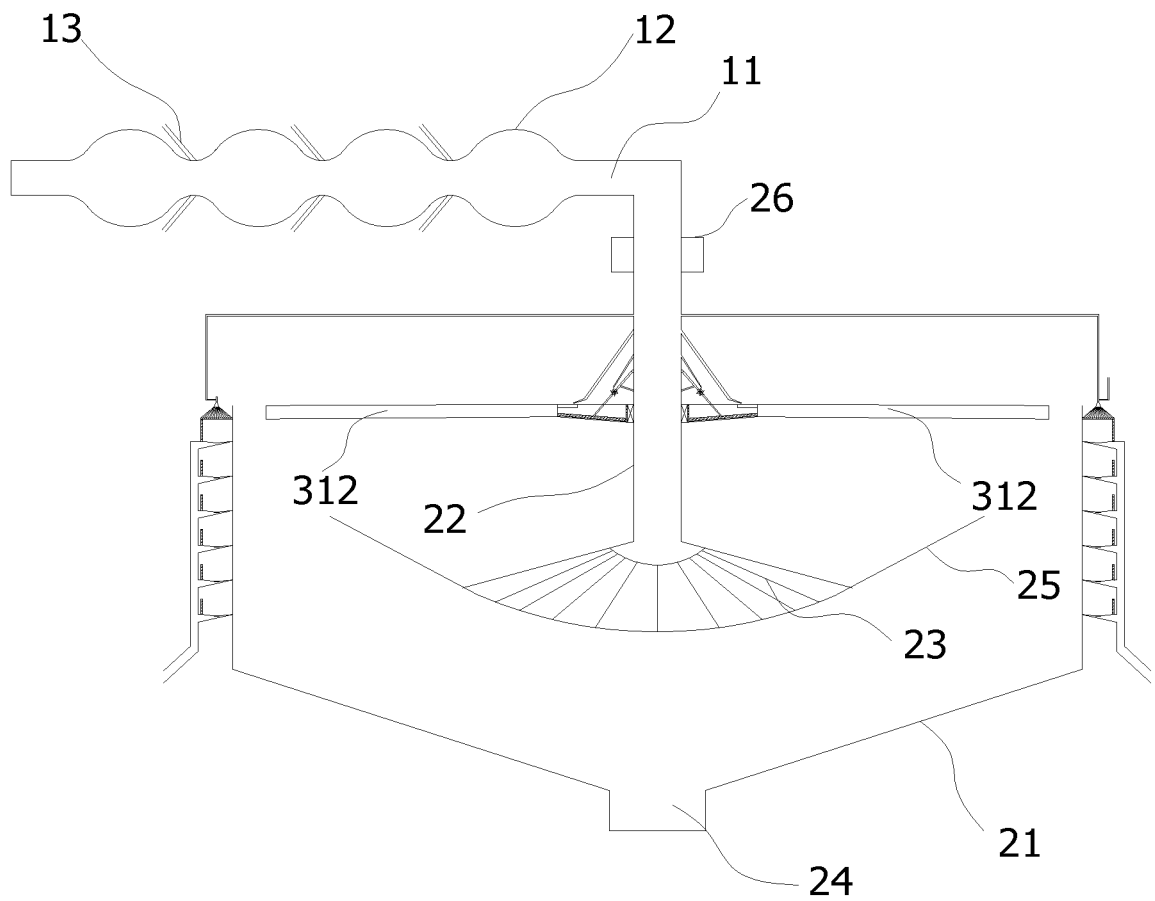
FIG. 2 is a structural diagram of the entire device when the diversion settlement zone is the first scheme.
Figure 3:
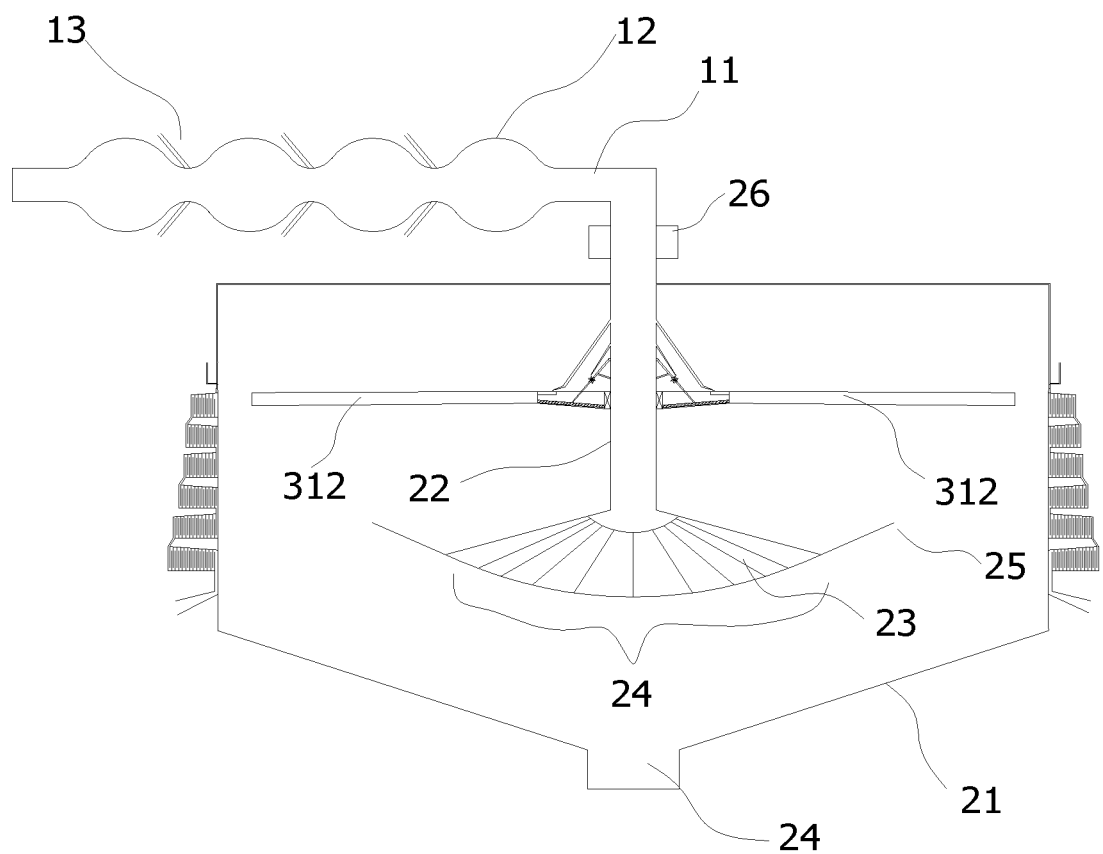
FIG. 3 is a structural diagram of the entire device when the diversion settlement zone is the second scheme.

As shown in FIGS. 2-3, the feed assembly 1 includes a main feeding pipe 11, a horizontal support rod 26 and a medicament ejection pipe 13.

One end of the main feed pipe 11 is fed with slime water, and the other end is used as the output end of the feed assembly. The middle of the main feed pipe 11 includes a reducing section 12. In this scheme, the reducing section 12 is composed of a round ball and a round tube, forming a gourd-like tube with alternating sudden expansion and sudden contraction.

Multiple medicament ejection pipes 13 are evenly distributed at the constriction of the reducing section 12 and communicates with the circular tube at the constriction. Because the flow velocity at the constriction suddenly increases, the junction of the reducing section 12 and the medicament ejection pipes 13 forms a negative pressure, it has a good suction effect on the flocculant in the medicament ejection pipes 13. At the sudden expansion, the pressure increases, the flow rate slows down, the turbulence intensity increases at this moment, and the flocculant and slime water are fully mixed.

The opening degree of the inlet of the medicament ejection pipes 13 can be controlled by a superior valve to control the inhalation of the medicament. The material and the medicament are mixed by the suction effect of the reducing section 12 and the medicament slurry.

2. Guide Assembly

Referring to FIGS. 2-3, the guide assembly 2 includes ejecting inlet pipe 22 and the dispersion deflector 23. The input end of the ejecting inlet pipe 22 is connected to the outlet end of the feed assembly 1. The dispersion deflector 23 diffuses the slime water output from the ejecting inlet pipe 22 to the surroundings. The materials and medicament are mixed and reacted at the funnel part of the central tank body 21. The coarse coal slime gradually sinks to the deep cone of the central tank body 21 for deposition, and reaches a certain amount of deposition and is discharged through the first discharge port 24. A bubble-inducing plate 25 is also arranged above the outlet of the dispersion deflector 23, and the foam produced after the reaction carries fine coal slime along with the bubble-inducing plate 25 and moves upward from the outer side wall of the central tank body 21 to the clean coal collecting assembly. In this scheme, the diversion component on the one hand discharges the coarse slime from the first discharge port 24, and on the other hand, the fine slime water is moved upwards along the inner side wall in the central tank 21 through the bubble-inducing plate 25. The clean coal collection component separates the fine coal slime from the water. Specifically, the bubble-inducing plate 25 has a spherical structure.

In order to support the feed assembly and the ejecting inlet pipe 22, a horizontal support rod 26 is fixed on the outer side wall of the ejecting inlet pipe 22.

3. Clean Coal Collection Components

The clean coal collection assembly 3 includes a driving zone located above the bubble-inducing plate 25 in the central tank body 21, multiple defoaming zones, and settling zones corresponding to the multiple defoaming zone. The dispersion deflector 23 in the deflector assembly is located below the defoaming zone. The multiple defoaming zones and the driving zones are annularly arranged on the outer side wall of the ejecting inlet pipe 22.

3.1 Driving Area

As shown in FIGS. 2-5, in order to drive the foam generated after the reaction to the bubbles deforming zone, the driving area includes a rotating bearing 311, an arc-shaped dial plate 312, a second impact tube 313 and a jet-driven curved plate 314. The defoaming area includes a clean coal collection tank 347, all clean coal collection tanks 347 and the jet-driven curved plate 314 are alternately arranged and connected to form an annular structure. The inner surface of the annular structure is set on the central feed pipe 22 through the rotating bearing 311. The second impact tube 313 is a branch tube separated from the central feed tube 22. The second impact tube 313 drives the curved plate 314 obliquely by impinging jets, such that the annular structure rotates around the central feed pipe 22. The arc-shaped dial plate 312 is circularly provided on the outside of the jet-driven curved plate 314. The other end of the arc-shaped dial plate 312 faces the inner side wall of the central groove body 21. In this way, the foam is transferred to the bubbles deforming area through the arc-shaped dial plate 312.

3.2 Bubbles Deforming Area

As shown in FIGS. 2-5, the bubbles defoaming zone includes multiple defoamer. The multiple defoamer are arranged in an annular array on the outer side wall of the central feed pipe 22 to improve the defoaming effect.

Figure 4:
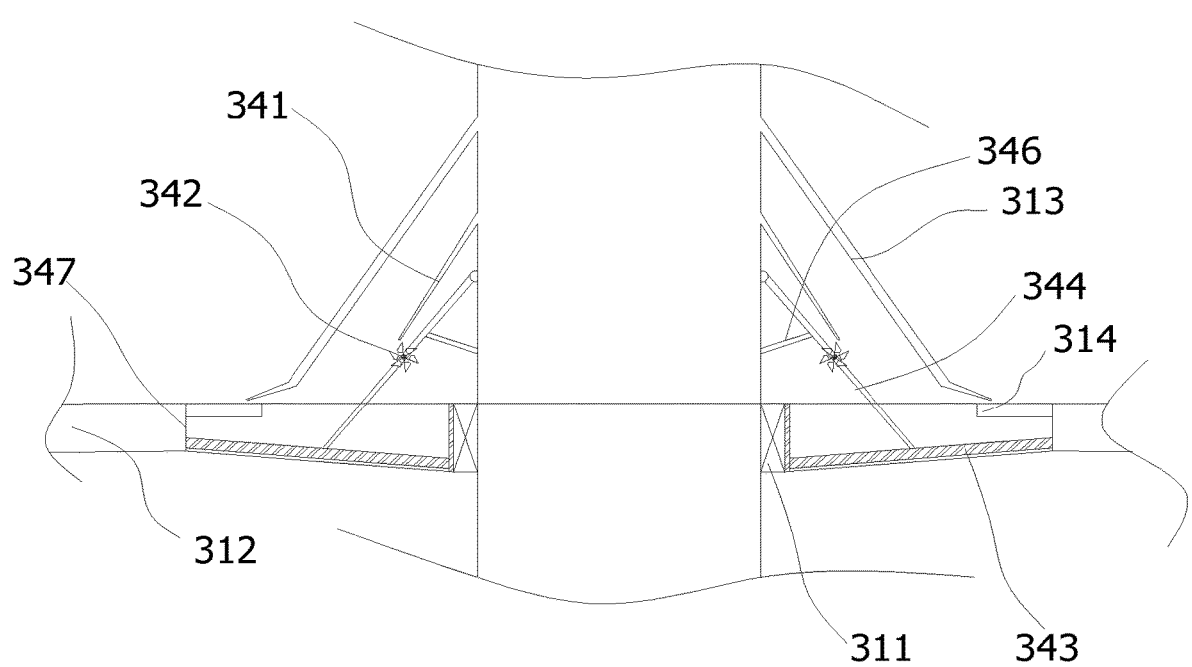
FIG. 4 is a structure diagram of the bubble deforming zone.
Figure 5:
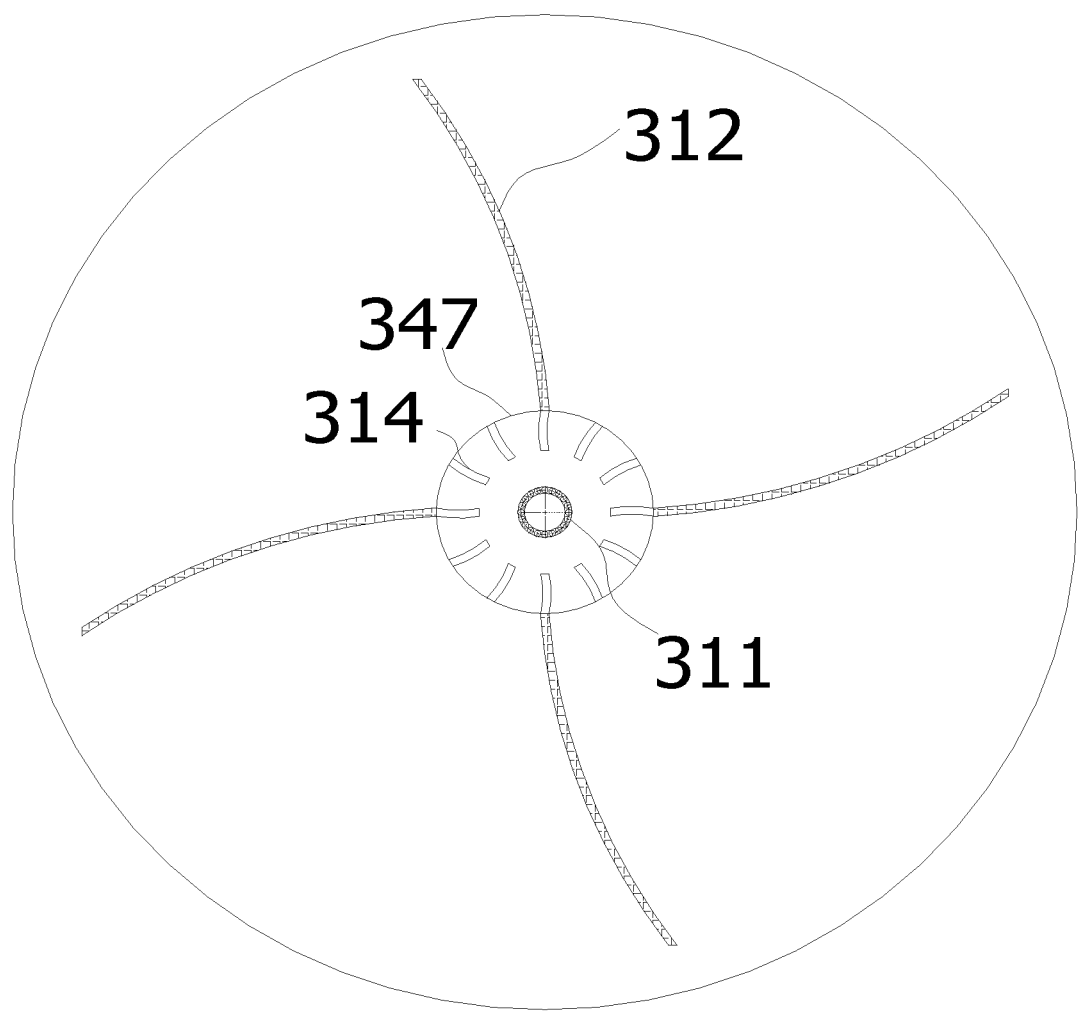
FIG. 5 is a top view of the drive area structure.

As shown in FIG. 4, the defoamer includes a hammer unit and a drive unit.

The hammering unit includes a hammering defoaming plate 343, a clean coal collecting tank 347, and a hammering rod 344. One end of the hammer rod 344 is hinged with the outer side wall of the central feed pipe 22, and the other end of the hammer rod 344 is hinged with the hammering defoaming plate 343. The clean coal collecting tank 347 and the jet-driven curved plate 314 form an annular structure and are arranged on the central feed pipe 22 through a rotating bearing 311.

The driving unit includes a first impact tube 341, a grooved roller 342, and a reciprocating spring 346. The central feed tube 22 is divided into a branch as the first impact tube 341. The lower end of the impact tube 341 faces the inner wall of the clean coal collecting tank 347 on the grooved roller 342. The middle part of the hammer rod 344 is connected to the middle part of the two side rods of the bracket 348 through a reciprocating spring 346. The grooved roller 342 is arranged on the hammer rod 344 and is connected by a rotating shaft. The hammering defoaming plate 343 hammers downward. After the hammering rod 344 is impacted, the deflection along the center is less than the compression of the reciprocating spring 346. When the material in the central feed pipe 22 flows from the first impact tube 341 into the grooved roller 342, the grooved roller 342 is rotated at a non-uniform speed. Due to the increase in the mass of the entire drive unit and the hammer unit, the reciprocating spring 346 is in a compressed state. The hammering defoaming plate 343 is compressed into the clean coal collecting tank 347 until there is too much material in the grooved roller 342, which causes the roller to rotate and dump all the materials. The energy accumulated by the reciprocating spring 346 makes the hammering defoaming plate 343 far away from the clean coal collecting tank 347. The cyclic movement realizes a reciprocally beats to the clean coal collecting tank 347 in the clean coal collecting tank 347, thus deforming the bubbles. The slime water thrown out of the first impact tube 341 will also wash the clean coal on the hammering defoaming plate 343, so that the clean coal is discharged from the concentrate discharge port to the clean coal collection tank 347 and collected.

In summary, the unsettled clean coal slime and the mineralized foam regenerated due to residual flotation reagents and clean coal will be converged to the driving area along with the water flow. Then being driven to the defoaming area, and a defoaming in the deforming area, the slime water containing fine slime overflows from the gap in the side wall of the central tank body 21.

3.3 Diversion and Settlement Area

There are many schemes for the diversion and settlement zone, as described below:

B 3.3 the First Scheme of Diversion Settlement Area

Figure 6:
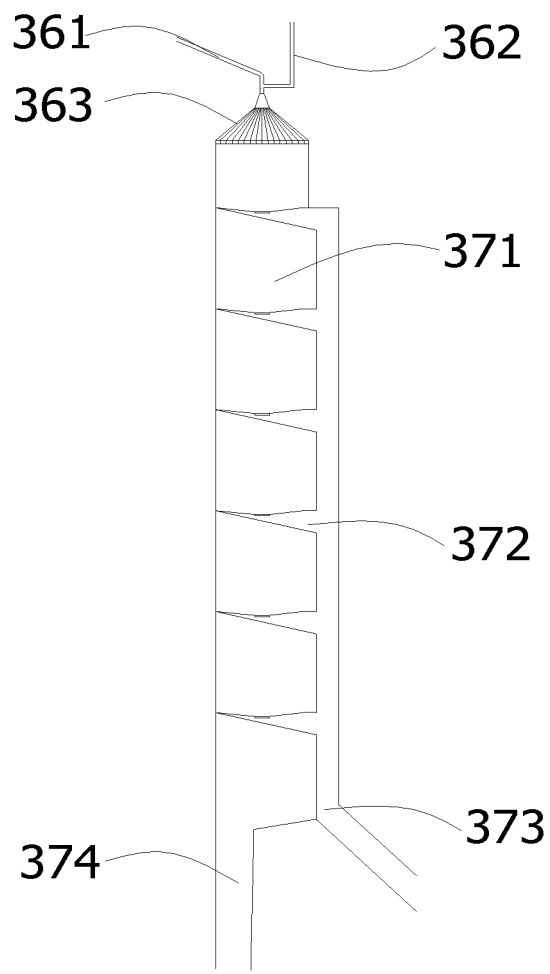
FIG. 6 and FIG. 7 are schematic diagrams of the structure of the when the diversion settlement zone is the first scheme.
Figure 7:
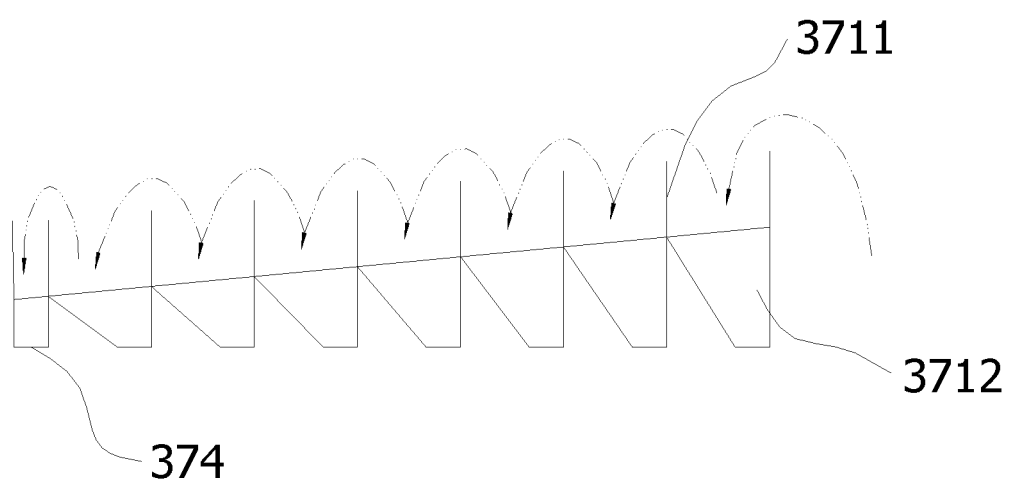

As shown in FIG. 2, FIG. 6 and FIG. 7, the diversion sedimentation zone includes an annular diversion sedimentation screen and a magnetic concentrating shower. The annular diversion sedimentation screen is spirally arranged downward around the central tank 21. The slime water overflowing from the gap of the central tank body 21 reaches the entrance of the annular diversion sedimentation screen. A magnetic concentrating shower is arranged above the overflow port of each defoaming zone.

B3.3.1 Annular Diversion Sedimentation Screen

As shown in FIG. 2, FIG. 6 and FIG. 7, the annular flow-guided sedimentation screen includes an annular groove 371 spirally arranged around the central groove body 21, and second spoiler baffles 3711 are sequentially arranged in the annular groove 371. The second underflow discharge port 3712 is provided on the bottom plate between two adjacent second turbulence partitions 3711, and the second turbulence partition 3711 increases the interference sedimentation effect of the fine coal slime. A second inclined plate diversion discharge pipe 372 is provided below the several second underflow discharge ports 3712, and the outlets of all the second inclined plate diversion discharge pipes 372 converge to the second underflow discharge pipe 373. That is, the settled material is discharged from the second underflow discharge pipe 373, and the settled water passes through the second baffle plate 3711 in the annular groove 371, and then flows from the second overflow discharge pipe 374 arranged at the end of the annular groove 371 and enters the washing process again as circulating water to realize a closed loop.

B3.3.2 Magnetic Concentrating Shower

As shown in FIG. 2, FIG. 6 and FIG. 7, the magnetic concentrating shower 39 includes a second magnetic concentrating ejection tube 361, a second magnetic powder feeding pipe 362, and a second distributor 363. The upper end of the second magnetism collecting and ejecting tube 361 is communicated with the feed distribution tank 11, and the lower end is communicated with the second distributor 363. One end of the second magnetic powder feed pipe 362 is connected to the pipe at the magnetic powder supply, and the other end is connected to the second magnetism collecting ejection pipe 361. The outlet of the lower end of the second distributor 363 is fan-shaped and is separated by a plurality of partitions, so that the magnetism collecting material at the outlet flows down evenly along the side wall of the deflector to realize fine coal accelerated sedimentation of mud. When the slime water passes through the annular diversion sedimentation screen, the magnetic concentrating shower sprays the magnetic seeds to obtain efficient sedimentation.

C3.3 the Second Scheme of Diversion Settlement Area

Figure 8:
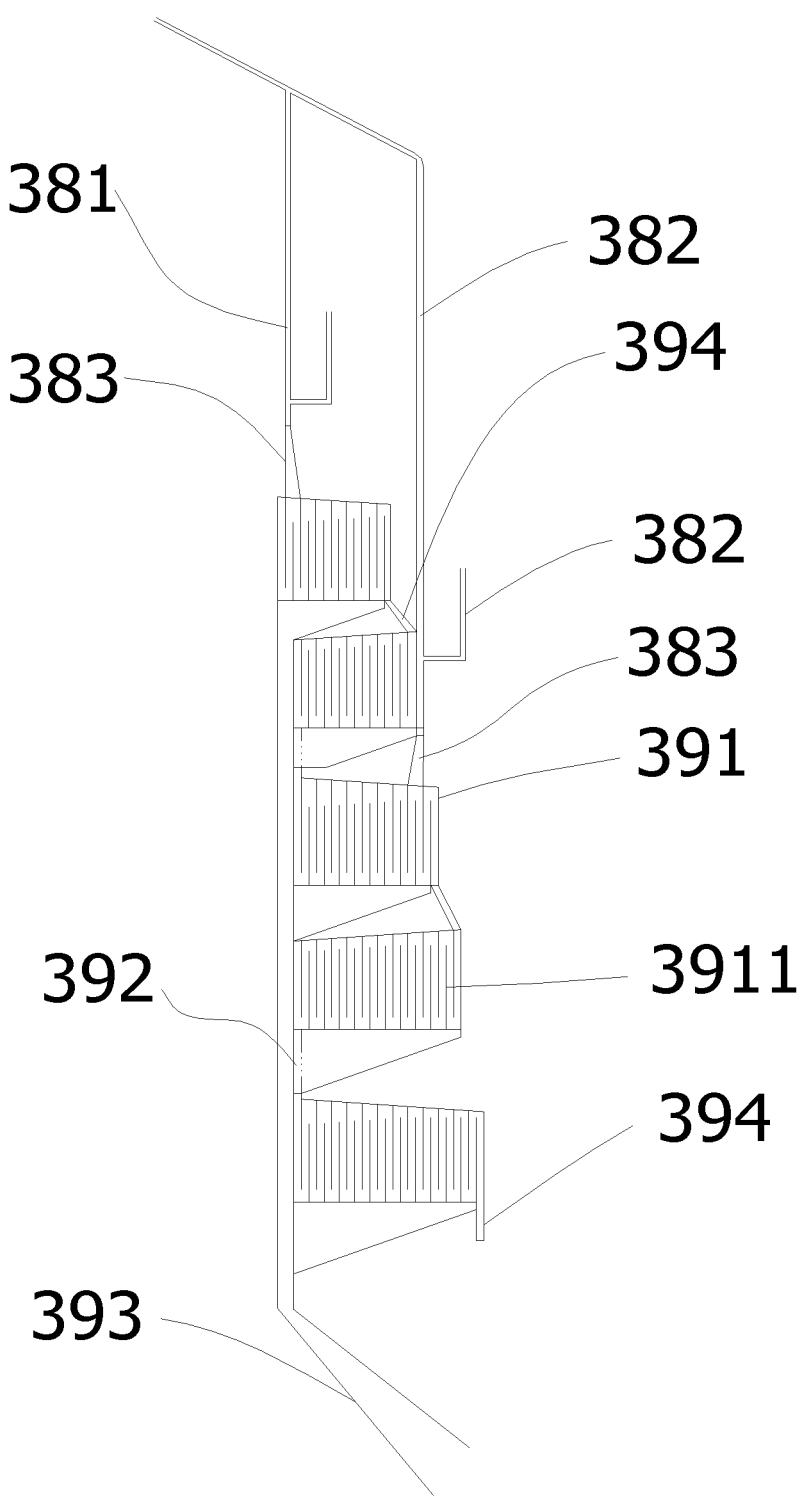
FIG. 8 and FIG. 9 are structural diagrams when the diversion settlement zone is the second scheme.
Figure 9:
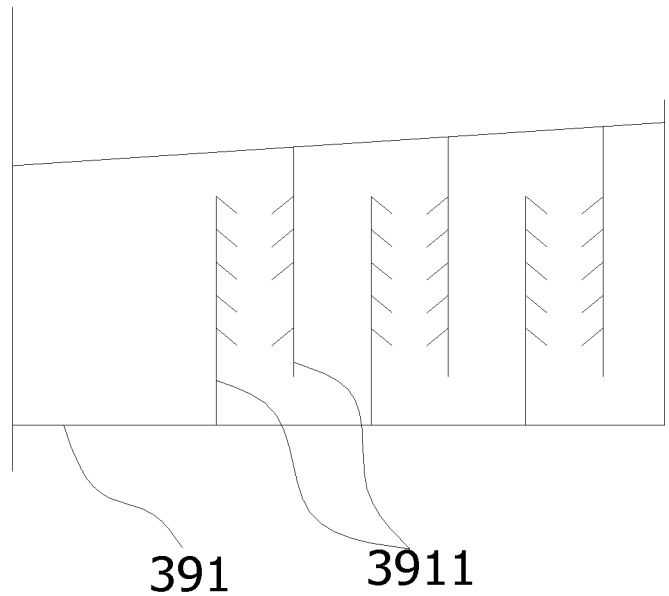

As shown in FIG. 3, FIG. 8 and FIG. 9, the diversion sedimentation zone includes a tiered diversion sedimentation screen and a magnetic concentrating shower. The tiered diversion sedimentation screen is arranged downwardly along the outer wall of the central tank body 21. In this embodiment, the first diversion sedimentation screen 32 in the defoaming zone extends to the inner side wall of the central tank body 21, and the slime water that has not settled at the first diversion sedimentation screen after defoaming overflows the central tank body 21 to the stratification diversion settling inside the screen. A magnetic concentrating shower is arranged above the overflow port of each defoaming zone.

C3.3.1 Laminar Diversion Sedimentation Screen

As shown in FIG. 3, FIG. 8 and FIG. 9, the laminar diversion sedimentation screen includes multiple third diversion and sedimentation subgroups sequentially arranged downward along the outer wall of the central tank body 21, and each third diversion and sedimentation subgroup includes a sedimentation tank 391. Multiple third spoiler baffles 3911 are alternately arranged in the settling tank 391, and the third spoiler baffles 3911 can be alternately arranged on both sides of the settling tank 391 according to the arrangement of the high board 322 and the low board 323. Among them, the third spoiler baffle 3911 increases the interference sedimentation effect of fine slime.

The bottom plate of the sedimentation tank 391 is provided with a third underflow discharge port, and each sedimentation tank 391 is provided with a third inclined plate guide discharge pipe 392. The third inclined plate guide discharge pipe 392 collects the fine slime discharged from all the third underflow discharge ports in each sedimentation tank 391. All the outlets of the third inclined plate guide discharge pipe 392 are collected into the third underflow discharge pipe 393, and finally, the settled fine slime is discharged from the third underflow discharge pipe 393.

After the unsettled part of the slime water passes through all the third baffle plates 3911 in each third diversion and settlement subgroup, it is output from the connecting pipe 395 to the entrance of the next third diversion and settlement subgroup to the lowest third diversion and sedimentation subgroup. The completely settled water is output from the third overflow discharge pipe 394 at the output end of the bottom third flow sedimentation subgroup, and enters the washing process again as circulating water to achieve closed loop.

C3.3.2 Magnetic Concentrating Shower

Referring to FIG. 3, FIG. 8 and FIG. 9, the magnetic concentrating shower 39 includes a third magnetism-concentrating ejection tube 381, a third magnetic powder feeding pipe 382 and a third distributor 383. The upper end of the third magnetism-concentrating ejection tube 381 also communicates with the feed distribution tank 11, and the lower end communicates with the third distributor 383. One end of the third magnetic powder feed pipe 382 is communicated with the pipe at the magnetic powder supply, and the other end is communicated with the third magnetism-concentrating ejection tube 381. The outlet at the lower end of the device 383 is fan-shaped, and is separated by multiple baffles, so that the magnetizing materials at the outlet flow down evenly along the side wall of the deflector to realize the accelerated settlement of the fine slime. When the slime water passes through the stratified diversion settling screen, the magnetic concentrating shower sprays the magnetic seeds to obtain high-efficiency settlement. Then, the fine slime is fully settled in this process and separated from the water more thoroughly. In order to achieve a better sedimentation effect, in this solution, magnetic concentrating showers are respectively arranged at the input ends of the multiple third diversion sedimentation subgroups.

Figure 10:
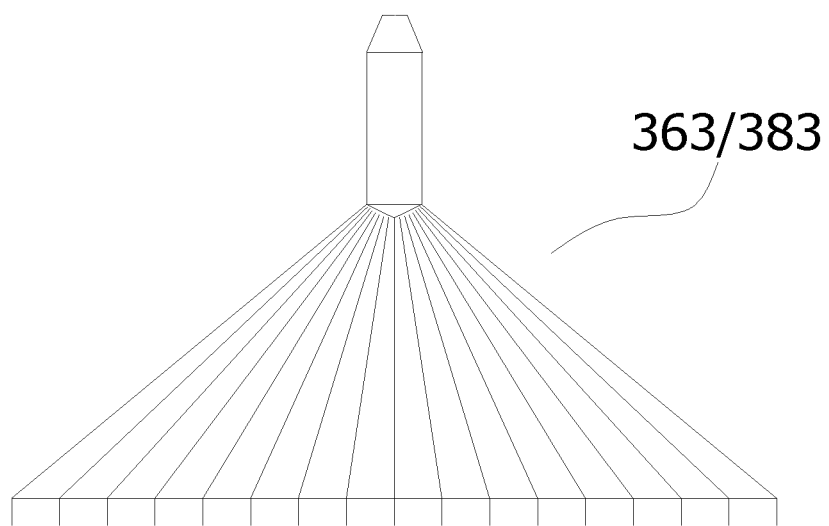
FIG. 10 is a structural diagram of the second distributor and the third distributor.

As shown in FIG. 10, the structures of the first distributor 353, the second distributor 363, and the third distributor 383 are all the same. The use of a multi-channel distributor makes the distributor more uniform and does not require rake stirring during the working process, thoroughly solving the "harrowing" phenomenon and ensuring the continuous and stable operation of the thickener.

To sum up, in the clean coal collection assembly, the structure of the central collection area 31, the foam suppression area, and the two diversion and settlement areas are arbitrarily combined to form different technical solutions.

The above are only the preferred embodiments created by the present disclosure, and are not intended to limit the creation of the present disclosure. Any modification, equivalent replacement and improvement made within the spirit and principle of the present disclosure should be included in the disclosure.

What is claimed is:

1. A rake-free thickening device, comprising a feed assembly, a diversion assembly and a clean coal collection assembly;
   wherein the clean coal collection assembly includes a driving area; the diversion assembly includes a central tank; slime water passes through the feed assembly and flows with a medicament from an upper part of the central tank to a middle of the central tank, and then diffuses around; bubbles carry fine slime up after reacting; the driving area drives dispersed bubbles to a defoaming zone arranged in the middle of the central tank; the slime water in the central tank flows through the central tank after defoaming; with the continuously filling of the slime water, the slime water above the central tank overflows the central tank to the clean coal collection assembly within a diversion and settlement area; and the diversion and settlement area is set on an outer side wall of the central tank;
   the diversion and settlement area includes an annular diversion sedimentation screen and a concentrated magnetic shower; the annular diversion sedimentation screen includes an annular groove spirally arranged around a central groove body; a plurality of second underflow discharge ports are provided on a lower bottom plate of the annular groove; a plurality of second sloping plate guide discharge pipes are provided below the plurality of second underflow discharge ports; outlets of the second sloping plate guide discharge pipes converge to the second underflow discharge pipe; and the settled water is discharged from the second overflow discharge pipe arranged at an end of the annular groove;
   the annular groove is sequentially arranged with second spoiler baffles along a length direction; the diversion assembly comprises an ejecting inlet pipe and a dispersion deflector; an input end of the ejecting inlet pipe is communicated with an outlet end of the feed assembly; and the dispersion deflector diffuses the slime water output by the ejecting inlet pipe to surroundings.

2. The device of claim 1, wherein the concentrated magnetic shower comprises a second magnetic concentrating ejection tube, a second magnetic powder feeding tube and a second dispenser; an upper end of the second magnetic concentrating ejection tube communicates with the feeding distribution tank in the feeding assembly, and a lower end of the second magnetic concentrating ejection tube communicates with the second dispenser; and one end of the second magnetic powder feeding tube is communicated with pipes of a magnetic powder supply, and the other end is communicated with the second magnetic concentrating ejection tube.

3. The device of claim 1, wherein the feed assembly includes a main feed pipe and a plurality of medicament ejection pipes; one end of the main feed pipe is input with slime water, and the other end of the main feed pipe is an output end of the feed assembly; the middle of the main feed pipe includes a reducing section, and the plurality of the medicament ejection pipes are evenly distributed at a sudden shrinkage of the reducing section, and communicate with the sudden shrinkage.

4. The device of claim 1, wherein the diversion assembly comprises a bubble-inducing plate, and the bubble-inducing plate is arranged above the outlet of the dispersion deflector.

5. The device of claim 1, wherein the driving area includes an arc-shaped dial plate and an arc drive; the arc-shaped dial plate extends from the middle of the central groove body to an inner side wall of the central groove body; and the arc drive drives the arc-shaped dial plate to rotate.

6. The device of claim 5, wherein the arc drive includes a rotating bearing, a second impact tube, and a jet-driven curved plate; the second impact tube is a branch tube separated from a central feed tube; the second impact tube drives the curved plate obliquely by impinging jets, such that the annular structure rotates around a central feed pipe; and the arc-shaped dial plate is circularly provided on the outside of the jet-driven curved plate.

7. The device of claim 6, wherein the defoaming zone includes a defoamer; the defoamer includes a hammering unit and a driving unit; the hammering unit includes a hammering defoaming plate, a clean coal collecting tank, and a hammering rod; one end of the hammer rod is hinged with the outer side wall of the central feed pipe, and the other end of the hammer rod is hinged with the hammering defoaming plate; the clean coal collecting tank and the jet-driven curved plate form an annular structure and are arranged on the central feed pipe through the rotating bearing; the driving unit includes a first impact tube, a grooved roller, and a reciprocating spring; the central feed tube is divided into a branch as the first impact tube; the lower end of the first impact tube faces the inner wall of the clean coal collecting tank on the grooved roller.

\* \* \* \* \*